US008215883B2

(12) United States Patent
Suzuki

(10) Patent No.: US 8,215,883 B2
(45) Date of Patent: Jul. 10, 2012

(54) METHOD FOR MACHINING CRANKSHAFT, APPARATUS FOR MACHINING CRANKSHAFT, CONTROL APPARATUS AND PROGRAM

(75) Inventor: Takeshi Suzuki, Komatsu (JP)

(73) Assignee: Komatsu Machinery Corporation Ltd., Komatsu-shi (JP)

( * ) Notice: Subject to any disclaimer, the term of this patent is extended or adjusted under 35 U.S.C. 154(b) by 1369 days.

(21) Appl. No.: 11/891,563

(22) Filed: Aug. 10, 2007

(65) Prior Publication Data

US 2008/0050192 A1    Feb. 28, 2008

(30) Foreign Application Priority Data

Aug. 22, 2006   (JP) ................. 2006-225083

(51) Int. Cl.
*B23C 3/06* (2006.01)
*B23Q 15/02* (2006.01)
(52) U.S. Cl. ........ 409/131; 409/200; 409/133; 409/207; 409/165; 29/888.08; 33/605
(58) Field of Classification Search .......... 409/131–132, 409/79–80, 84, 133, 188, 195, 199–200, 409/207, 165–166; 29/6.01, 888.08; 33/605
See application file for complete search history.

(56) References Cited

U.S. PATENT DOCUMENTS

| 6,470,775 B1 | 10/2002 | Kohlhase et al. |
| 2004/0215414 A1 | 10/2004 | Kaisser |

FOREIGN PATENT DOCUMENTS

| DE | 197 49 940 C2 | 5/1999 |
| DE | 100 30 087 A1 | 1/2002 |
| DE | 103 34 035 A1 | 2/2005 |
| JP | 62-255047 A | 11/1987 |
| JP | 07-164279 A | 6/1995 |
| JP | 08-211919 A | 8/1996 |
| JP | 2691894 B2 | 9/1997 |
| JP | 11-083413 A | 3/1999 |
| JP | 2002-200517 A | 7/2002 |
| WO | WO/03/057400 A1 * | 7/2003 |

OTHER PUBLICATIONS

Machine Translation DE 10334035, which DE '035 was published Feb. 2005.*
Machine Translation of WO 03/057400, which WO '400 was published Jul. 2003.*
German Office Action (and English translation thereof) dated Nov. 23, 2008, issued in a counterpart German Application.
English language translation of a Japanese Office Action dated Mar. 23, 2010 issued in counterpart Japanese Application No. 2006-225083.

* cited by examiner

*Primary Examiner* — Erica E Cadugan
(74) *Attorney, Agent, or Firm* — Holtz, Holtz, Goodman & Chick, PC

(57) ABSTRACT

To increase precision in straightness on a journal thrust surface relative to an outer peripheral surface of a journal in a crankshaft, a control system is provided for controlling movement of a cutter in axial directions by running a control program transferred from an automatic programming apparatus. The automatic programming apparatus corrects machining data on the basis of data for correcting the straightness gained through a comparison between results of a measurement of machining dimensions of the journal thrust surface in the workpiece on which a cutting process has been carried out and target machining dimensions for the journal thrust surface. A control program is prepared on the basis of the corrected machining data after correction of the machining data.

1 Claim, 17 Drawing Sheets

FIG. 4
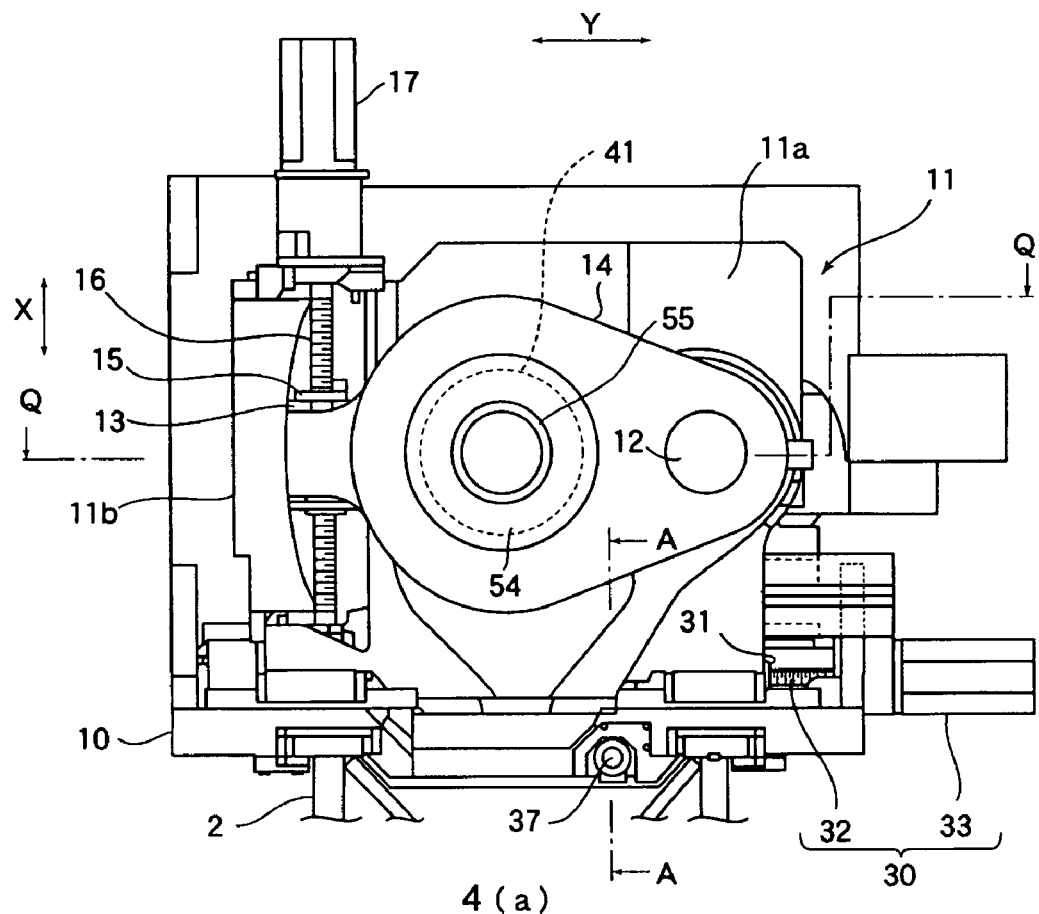
4 (a)
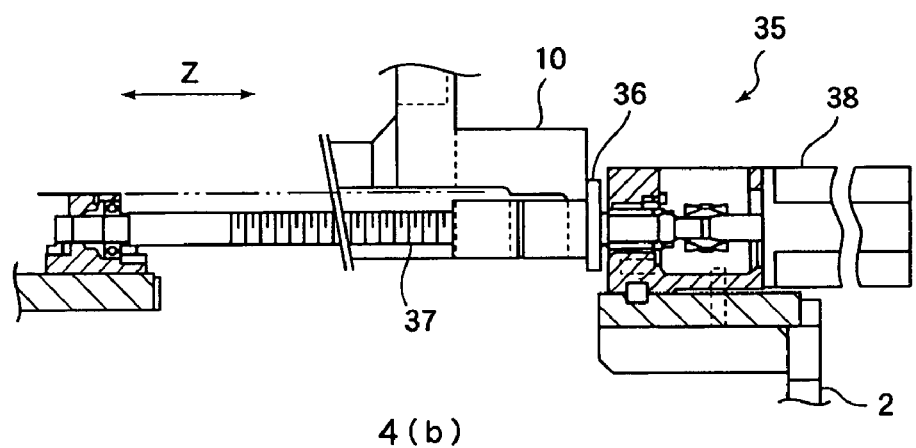
4 (b)

FIG. 6
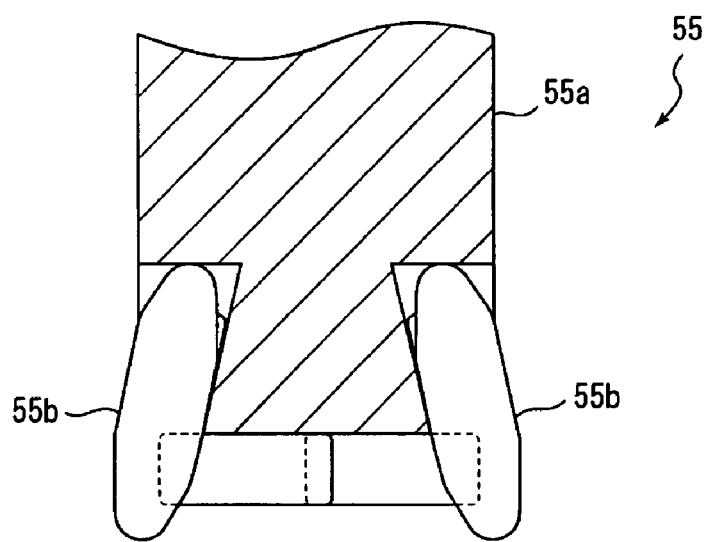
6(a)
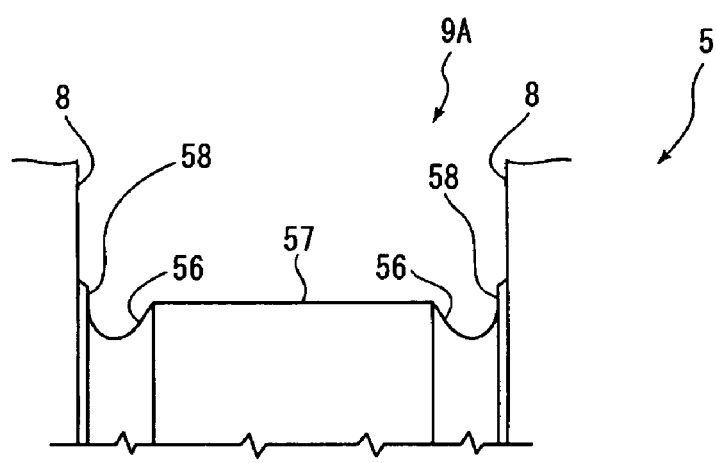
6(b)

FIG. 10
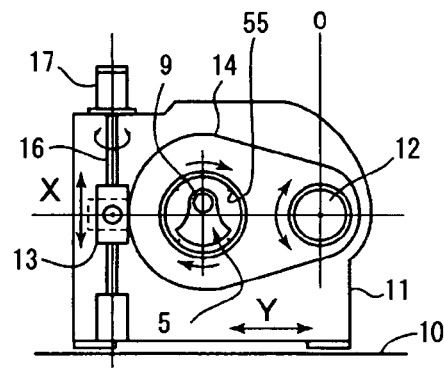
10(a) start
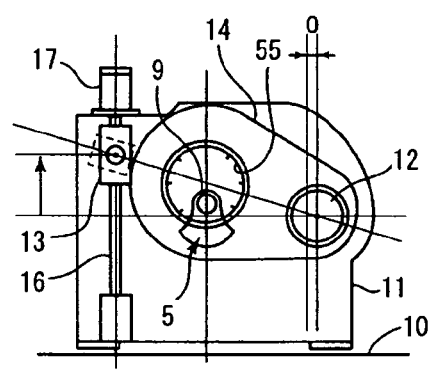
10(b) plunge cutting at 0°
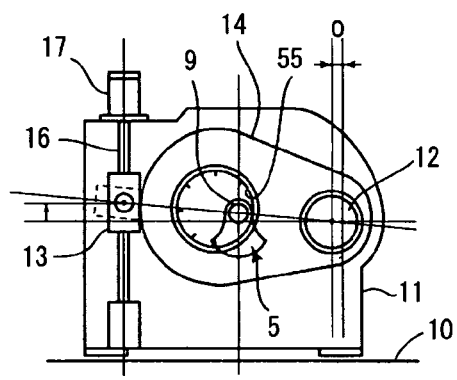
10(c) rotary cutting at 90°
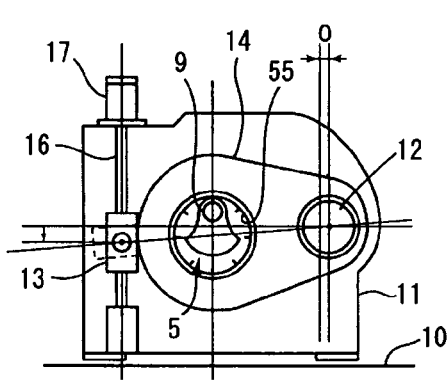
10(d) rotary cutting at 180°
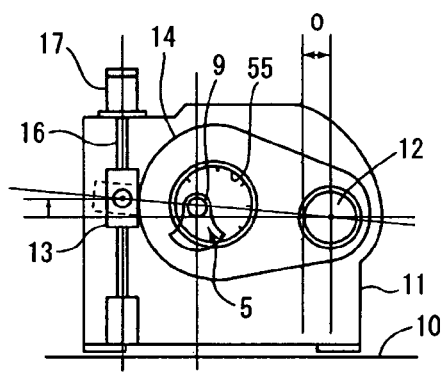
10(e) rotary cutting at 270°
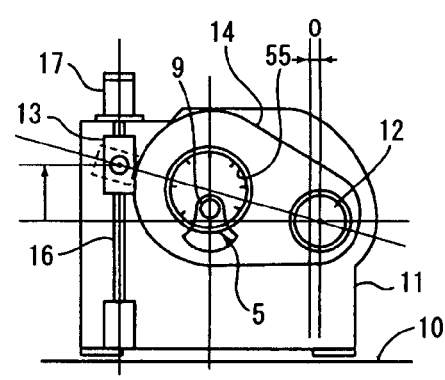
10(f) rotary cutting at 360°

FIG. 12

```
M201 ················································································ waiting for second cutter unit
M102 ················································································ waiting for second cutter unit
G90 G00 X8.425 Y-53.247 M10 ······················································· closing operation of rest arms
M301 ················································································ waiting for second cutter unit
   ⎧ G01 G42    X9.205      Y-58.184            F653.  ························· correction of blade edge R,
   ⎪                                                                             plunge cutting
   ⎪ G17 G02   X-0.000      Y-59.000    R52.220 F2491. ························· start of rotary cutting
   ⎪ G17 G02   X-9.205      Y-58.181    R52.224 F2491.
   ⎪ G17 G02   X-18.131     Y-55.745    R51.963 F2494.
   ⎪ G17 G02   X-26.506     Y-51.746    R51.672 F2501.
90 ⎨
   ⎪    .  .  .                    92
   ⎪                       91
   ⎪ G17 G02   X-26.506     Y-50.445    R55.249 F2659.
   ⎩ G17 G02   X-18.131     Y-55.139    R50.122 F2588.
G01 G40     X-15.058     Y-45.836            F2400. ···························· return in delay, correction of blade
                                                                                 edge R, cancel
M401 ················································································ waiting for second cutter unit
G00 X0. Y0. M11 ································································· return to original point along X and Y
                                                                                 axes, opening operation of rest arms
M501 ················································································ waiting for second cutter unit
M99 ················································································· return
```

FIG. 13

```
M201·································································· ···waiting for second cutter unit
M102·································································· ···waiting for second cutter unit
G90 G00 X8.425 Y-53.247 M10······································· ···closing operation of rest arms
M301·································································· ···waiting for second cutter unit
⎧ G01 G42  X9.205     Y-58.184   Z-0.030   F653.  ············· correction of blade edge R,
⎪ G17 G02  X-0.000    Y-59.000   Z-0.025   R52.220 F2491. ····· plunge cutting
⎪ G17 G02  X-9.205    Y-58.181   Z-0.010   R52.224 F2491.       start of rotary cutting
⎪ G17 G02  X-18.131   Y-55.745   Z0.015    R51.963 F2494.
⎪ G17 G02  X-26.506   Y-51.746   Z0.035    R51.672 F2501.
90⎨ G17 G02    .          92         93
⎪         .
⎪         .
⎪ G17 G02  X-26.506   Y-50.445   Z-0.025   R55.249 F2659.
⎩ G17 G02  X-18.131   Y-55.139   Z-0.030   R50.122 F2588. ····· return in delay, correction of blade
          91                                                    edge R, cancel
G01 G40  X-15.058    Y-45.836             F2400.
M401································································· ···waiting for second cutter unit
G00 X0. Y0. M11···················································· ···return to original point along X and Y
                                                                     axes, opening operation of rest arms
M501································································· ···waiting for second cutter unit
M99··································································· ···return
```

FIG. 14

| corrected value [mm] | angle | value at time [mm] | total value [mm] |
|---|---|---|---|
| 0.000 | 0° | 0.000 | 0.000 |
| 0.000 | 10° | 0.000 | 0.000 |
| 0.000 | 20° | 0.000 | 0.000 |
| 0.000 | 30° | 0.000 | 0.000 |
| 0.000 | 40° | 0.000 | 0.000 |
| 0.000 | 50° | 0.000 | 0.000 |
| 0.000 | 60° | 0.000 | 0.000 |
| 0.000 | 70° | 0.000 | 0.000 |
| 0.000 | 80° | 0.000 | 0.000 |
| 0.000 | 90° | 0.000 | 0.000 |
| 0.000 | 100° | 0.000 | 0.000 |
| 0.000 | 110° | 0.000 | 0.000 |
| 0.000 | 120° | 0.000 | 0.000 |
| 0.000 | 130° | 0.000 | 0.000 |
| 0.000 | 140° | 0.000 | 0.000 |
| 0.000 | 150° | 0.000 | 0.000 |
| 0.000 | 160° | 0.000 | 0.000 |
| 0.000 | 170° | 0.000 | 0.000 |
| 0.000 | 180° | 0.000 | 0.000 |
| 0.000 | 190° | 0.000 | 0.000 |
| 0.000 | 200° | 0.000 | 0.000 |
| 0.000 | 210° | 0.000 | 0.000 |
| 0.000 | 220° | 0.000 | 0.000 |
| 0.000 | 230° | 0.000 | 0.000 |
| 0.000 | 240° | 0.000 | 0.000 |
| 0.000 | 250° | 0.000 | 0.000 |
| 0.000 | 260° | 0.000 | 0.000 |
| 0.000 | 270° | 0.000 | 0.000 |
| 0.000 | 280° | 0.000 | 0.000 |
| 0.000 | 290° | 0.000 | 0.000 |
| 0.000 | 300° | 0.000 | 0.000 |
| 0.000 | 310° | 0.000 | 0.000 |
| 0.000 | 320° | 0.000 | 0.000 |
| 0.000 | 330° | 0.000 | 0.000 |
| 0.000 | 340° | 0.000 | 0.000 |
| 0.000 | 350° | 0.000 | 0.000 |
| 0.000 | 360° | 0.000 | 0.000 |

METHOD FOR MACHINING CRANKSHAFT, APPARATUS FOR MACHINING CRANKSHAFT, CONTROL APPARATUS AND PROGRAM

TECHNICAL FIELD

The present invention relates to a method for machining a crankshaft used in an engine or the like, and an apparatus for machining the same, as well as a control apparatus for controlling the apparatus for machining a crankshaft and a program which is run in a computer apparatus for preparing the control program for the same.

BACKGROUND ART

Crankshaft milling machines are used as conventional machining apparatuses for cutting and machining crankshafts used in engines or the like. Such crankshaft milling machines are provided with two work heads which are installed on a bed and support two end portions of a workpiece, and a cutter unit which is placed between the two work heads and machines a workpiece.

The above described cutter unit is provided with a saddle which is freely moveable in the longitudinal direction of the bed (direction of the Z axis) and a slide which is freely moveable in the direction of the Y axis (direction of the depth), which is perpendicular to the Z axis, on this saddle. In addition, a swing head of which one end portion is supported by a support axis and the other end portion swings in the up-down direction (direction of the X axis) due to a swing mechanism installed on the slide is mounted on the slide.

A cutter drum which is rotated by a cutter motor is provided in the above described swing head, and a cutter is mounted on this cutter drum via a cutter adaptor. This cutter is formed of a main cutter body in ring form and a number of cutter chips which are attached in the inner periphery portion of this main cutter body with intervals in the direction of circulation, and some of these cutter chips create the outer peripheral surface of the journal of a workpiece, while others simultaneously create trenches in the two end portions of the journal of a workpiece and a journal thrust surface which continues to the respective trenches and crosses the outer peripheral surface of the journal at a right angle.

In addition, in such conventional crankshaft milling machines, the cutter itself is rotated on the basis of machining data inputted in a control apparatus (NC apparatus) attached to the main body of the machine, and at the same time, the cutter is rotated around the journal of the workpiece through movement of the cutter in the direction of the X axis and in the direction of the Y axis so that a cutting process is carried out on the workpiece, and thus, the outer peripheral surface of the journal of the workpiece and a journal thrust surface which crosses the outer peripheral surface of the journal of workpiece at a right angle are created. Here, when the cutting process is carried out, the workpiece is sandwiched between work rests so as to be prevented from vibrating during the cutting process.

Incidentally, the precision required for the circularity on the outer peripheral surface of the journal is high in the machining of a crankshaft. In addition, in recent years, high precision has become a requirement for the straightness on the journal thrust surface which makes a right angle with the outer peripheral surface of the journal. In the above described conventional crankshaft milling machines, however, the workpiece slightly bends, even though the workpiece is prevented from vibrating by the work rests during the cutting process, and therefore, it is difficult to increase the circularity on the outer peripheral surface of the journal and the straightness on the thrust surface of the journal.

The precision in the circularity on the above described outer peripheral surface of the journal can be increased using, for example, a control apparatus for a crankshaft milling machine as that proposed in Patent Document 1 (Japanese Patent No. 2691894). In this control apparatus, the amount of feed of the cutter relative to the outer peripheral surface of the journal is controlled on the basis of corrected machining data after the machining data is corrected on the basis of data for correcting the circularity, which is gained by comparing the results of measurement of the machining dimensions of the outer peripheral surface of the journal and the target machining dimensions in a workpiece where a cutting process was carried out with the cutter in advance, and therefore, error in machining caused by bending of the workpiece can be reduced, and thus, such effects are gained that the precision in the circularity on the outer peripheral surface of the journal can be increased.

However, the technology for increasing the precision in the circularity according to the above described Patent Document 1 cannot be applied as a means for increasing the precision in the straightness on the thrust surface of the journal as it is. Here, as a means for increasing the precision in the straightness on the thrust surface of the journal, a means for taking apart and adjusting the machine, for example the cutter unit or the work heads provided on the bed, for correction can be cited, but in such means for correction, 1) a great amount of labor and time are required, 2) change in the type of the workpiece and the like cannot be dealt with, 3) correction cannot be made for every machined portion and so forth, and therefore, it is practically impossible to use a means for correction by taking apart and adjusting the machine in this manner, and thus, there is a problem, such that the precision in the above described straightness cannot be increased.

The present invention is provided in view of these problems, and an object of the invention is to provide a method for machining a crankshaft according to which the precision in the straightness on the thrust surface of the journal relative to the outer peripheral surface of the journal can be increased, an apparatus for machining a crankshaft, a control apparatus and a program.

SUMMARY OF THE INVENTION

In order to achieve the above described object, the method for machining a crankshaft according to a first invention is a method for machining a crankshaft wherein a cutting process is carried out on a workpiece using a rotary cutter on the basis of preset machining data, and thus, the thrust surface of a journal which makes a right angle with the outer peripheral surface of the journal of the workpiece is formed, including:

the step of measuring dimensions of the above described thrust surface of the journal to be machined in the workpiece on which the above described cutting process has been carried out in advance;

the step of preparing data for correcting straightness by comparing the results of measurement of the above described dimensions of the thrust surface of the journal to be machined and target dimensions for the thrust surface of the journal to be machined; and the step of correcting the above described machining data on the basis of the above described data for correcting the straightness, characterized in that the amount of feed of the above described rotary cutter in a direction along an axis of the workpiece is controlled on the basis of the corrected machining data after the above described correction when the above described cutting process is carried out on a workpiece on which a cutting process is to be carried out next.

Next, the apparatus for machining a crankshaft according to a second invention is an apparatus for machining a crankshaft wherein a cutting process is carried out on a workpiece using a rotary cutter on the basis of preset machining data, and thus, a thrust surface of a journal which makes a right angle with the outer peripheral surface of the journal of the workpiece is formed, comprising:

a feed mechanism for moving the above described rotary cutter in a direction along an axis of the workpiece; and a control apparatus for controlling an amount of the feed in the above described feed mechanism, characterized in that the above described control apparatus controls the amount of feed in the above described feed mechanism on the basis of corrected machining data after correction of the above described machining data on the basis of data for correcting straightness which is gained through comparison between the results of measurement of dimensions of the thrust surface of the above described journal to be machined in the workpiece on which the above described cutting process has been carried out in advance and target dimensions for the thrust surface of the journal to be machined.

Next, the control apparatus according to a third invention is a control apparatus for controlling an apparatus for machining a crankshaft wherein a cutting process is carried out on a workpiece using a rotary cutter on the basis of preset machining data, and thus, a thrust surface of a journal which makes a right angle with an outer peripheral surface of the journal of the workpiece is formed, characterized in that:

an amount of feed in a feed mechanism for moving the above described rotary cutter in a direction along an axis of the workpiece is controlled on the basis of corrected machining data after correction of the above described machining data on the basis of data for correcting straightness which is gained through comparison between the results of measurement of dimensions of the thrust surface of the above described journal to be machined in the workpiece on which the above described cutting process has been carried out in advance and target dimensions for the thrust surface of the journal to be machined.

Next, the program according to a fourth invention is a program which is run in a computer apparatus for preparing a control program for controlling an apparatus for machining a crankshaft wherein a cutting process is carried out on a workpiece using a rotary cutter on the basis of preset machining data, and thus, a thrust surface of a journal which makes a right angle with an outer peripheral surface of the journal of the workpiece is formed, characterized in that the program allows the above described computer apparatus to carry out:

a process for correcting the above described machining data on the basis of data for correcting straightness which is gained through comparison between the results of measurement of dimensions of the thrust surface of the above described journal to be machined in the workpiece on which the above described cutting process has been carried out in advance and target dimensions for the thrust surface of the journal to be machined; and a process for preparing the above described control program on the basis of the corrected machining data after the above described correction.

According to the present invention, machining data is corrected on the basis of the data for correcting the straightness which is gained through comparison between the results of measurement of the dimensions of the thrust surface of the journal to be machined in a workpiece on which a cutting process has been carried out in advance and the target dimensions for the thrust surface of the journal to be machined, and the amount of feed of a rotary cutter in the direction along the axis of the workpiece is controlled on the basis of the machining data after correction when the next cutting process is carried out on the workpiece on which a cutting process is to be carried out, that is to say, locations on the thrust surface of the journal where the amount of cutting of the rotary cutter is great and small are found on the basis of the measured values of the machined workpiece, and thus, the amount of feed of the rotary cutter in the direction along the axis of the workpiece is controlled so that the amount of cutting is reduced in locations where the amount of cutting is great at the time of the first machining at the time of the next machining, and the amount of cutting is increased in locations where the amount of cutting is small at the time of the first machining at the time of the next machining, and therefore, the difference between the dimensions of the machined thrust surface of the journal and the target dimensions of the thrust surface of the journal to be machined can be reduced, and thus, the precision in the straightness on the thrust surface of the journal relative to the outer peripheral surface of the journal can be increased. These working effects are gained through machining using software for correcting the machining data on the basis of the data for correcting the straightness which is gained through comparison between the dimension of the machined workpiece and the target dimensions for the workpiece to be machined, and therefore, there are advantages such that 1) the precision during machining can be increased easily and in a short period of time, 2) data can be corrected in response to change in the type of workpiece and the like, and 3) data can be corrected for each portion to be machined.

BRIEF DESCRIPTION OF THE DRAWINGS

FIG. 4(a) is a front diagram showing a cutter unit, and FIG. 4(b) is a cross sectional diagram showing the cutter unit along A-A in FIG. 4(a);

FIG. 6(a) is an enlarged diagram showing the portion H in FIG. 2, and

FIG. 6(b) is an enlarged diagram showing the portion R;

FIGS. 10(a) to 10(f) are diagrams showing the movement of a cutter in steps following the procedure for machining the crankshaft;

FIG. 12 is a diagram showing the contents of a subprogram for machining before correction of the straightness;

FIG. 13 is a diagram showing the contents of a subprogram for machining after correction of the straightness;

FIG. 14 is a diagram showing the initial screen in a displaying portion in the straightness correction mode;

DETAILED DESCRIPTION OF THE INVENTION

Next, concrete embodiments of the method for machining a crankshaft, the apparatus for machining a crankshaft, the control apparatus and the program according to the present invention are described in reference to the drawings. Here, the present embodiment is an example of a crankshaft milling machine with an inner blade type rotary cutter, which is an apparatus for cutting and machining a crankshaft to which the present invention is applied.

Figure 1:
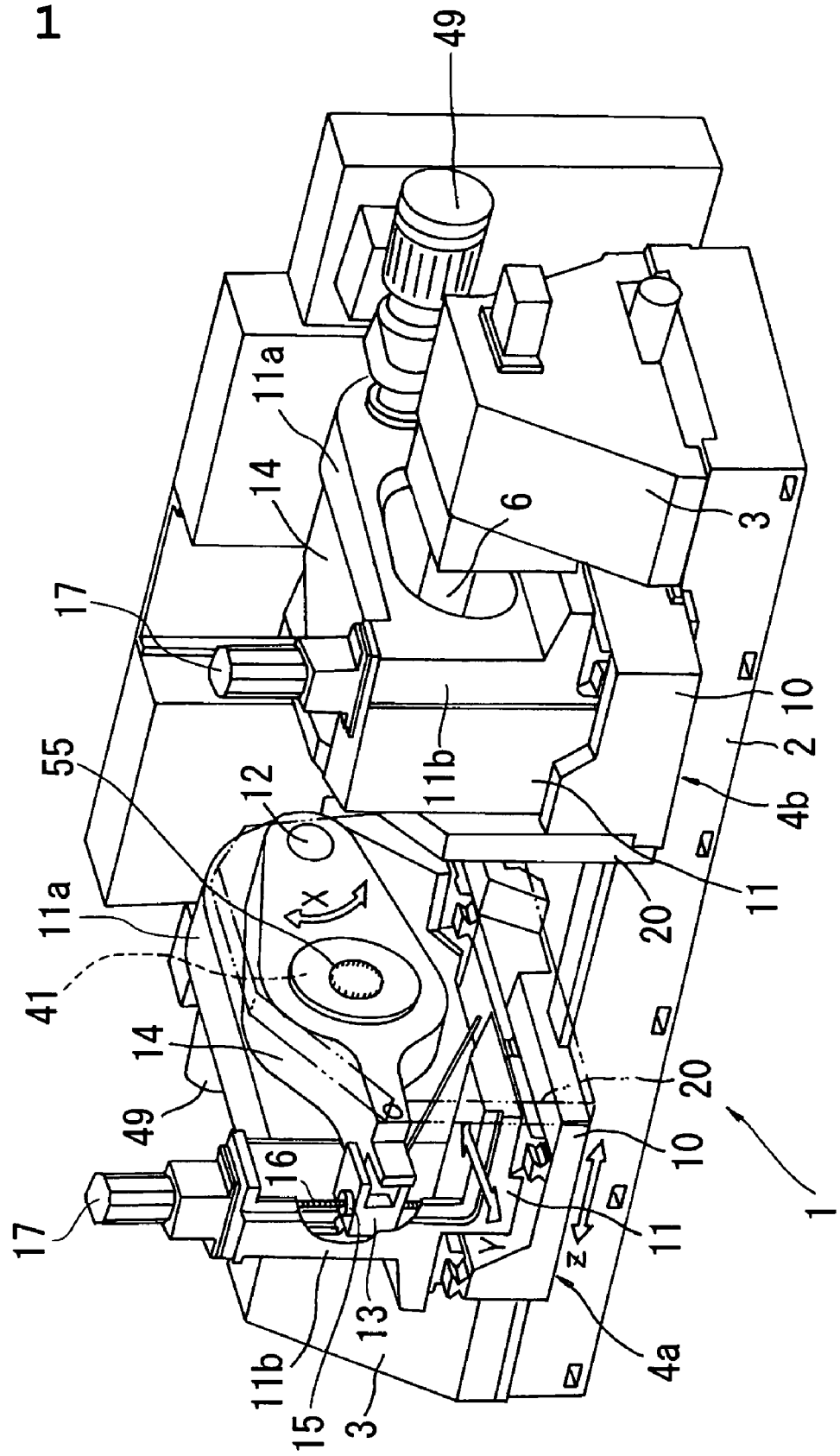
FIG. 1 is a perspective diagram showing the entirety of the crankshaft milling machine according to the first embodiment of the present invention.
Figure 2:
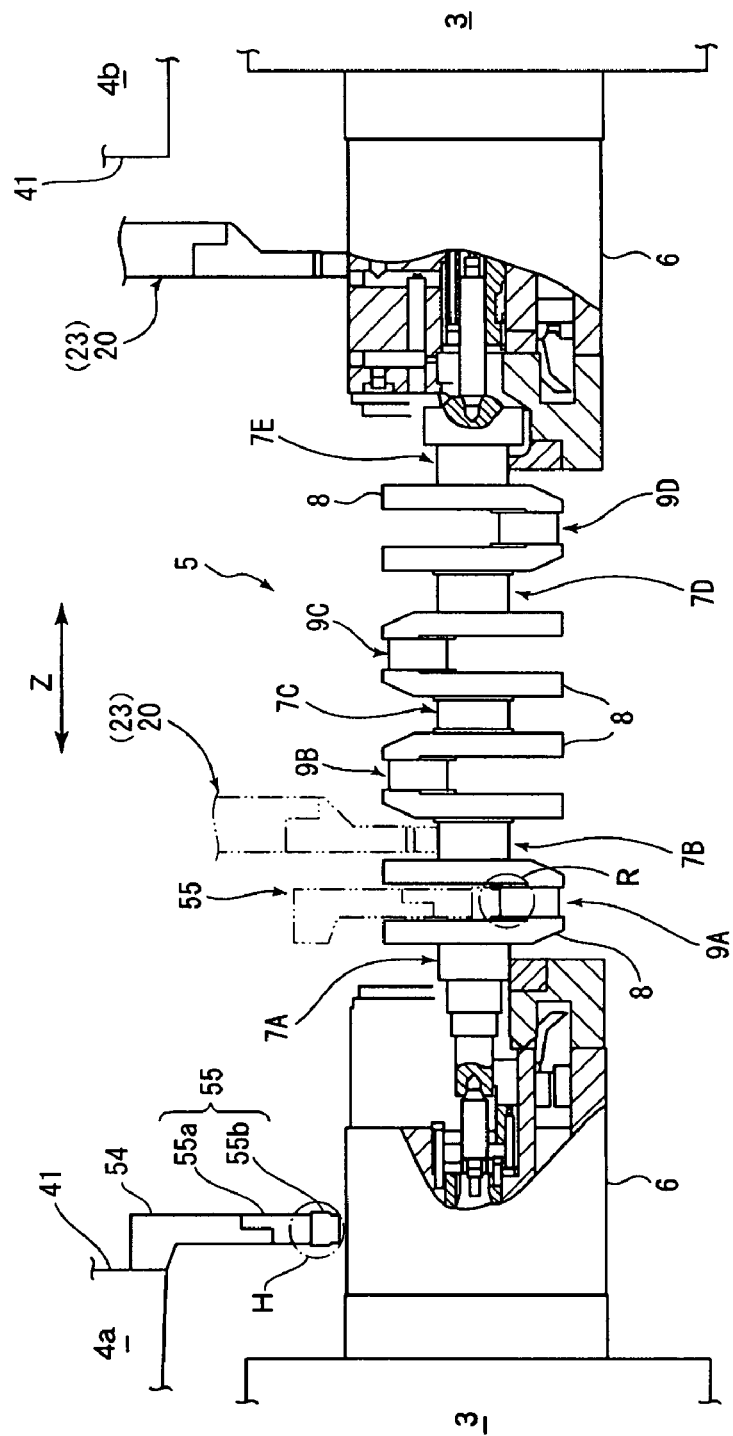
FIG. 2 is a diagram showing a state where a workpiece is set between work heads.

FIG. 1 is a perspective diagram showing the entirety of the crankshaft milling machine according to one embodiment of the present invention. In addition, FIG. 2 is a diagram showing a state where a workpiece is set between work heads.

The crankshaft milling machine 1 of the present embodiment is provided with two work heads 3 and 3 which are installed on a bed 2 in such a manner as to face each other, a first cutter unit 4a and a second cutter unit 4b, which are installed between these work heads 3 and 3.

Chucks 6 and 6 for clamping a work piece (crankshaft for a four-cylinder engine) 5 are respectively provided on the surfaces of the above described work heads 3 and 3 which face each other. The above described work piece 5 is provided with a first main journal 7A, a second main journal 7B, a third main journal 7C, a fourth main journal 7D and a fifth main journal 7E which are aligned in this order from left to right in FIG. 2 with predetermined intervals in the direction of the axis of the work piece, as well as a first pin journal 9A, a second pin journal 9B, a third pin journal 9C and a fourth pin journal 9D which are aligned along an axis parallel to the axis of these main journals in this order from left to right in FIG. 2 with predetermined phases around the axis of the work piece. Here, in the following, the first main journal 7A, the second main journal 7B, the third main journal 7C, the fourth main journal 7D and the fifth main journal 7E are referred to under the general term "main journals 7," and the first pin journal 9A, the second pin journal 9B, the third pin journal 9C and the fourth pin journal 9D are referred to under the general term "pin journals 9."

The above described cutter units 4a and 4b are each provided with a saddle 10, which is freely moveable in the longitudinal direction of the bed 2 (direction of the Z axis), and a slider 11 which is freely moveable in the direction of the Y axis (direction toward the rear of the bed), which is perpendicular to the Z axis, is provided on each saddle 10. Each slider 11 has a support wall 11a which extends in the direction of the Y axis and is oriented in the longitudinal direction, and a hollow support axis 12 is provided in one end portion of each support wall 11a, and a case 11b in quadrangular tube form which extends in the vertical direction is provided in the other end portion of the support wall 11a. In addition, a swing head 14 of which one end portion is supported by the above described support axis 12 and the other end portion is supported by a guide member 13, which is freely movable upward and downward within the above described case 11b, in such a manner as to be freely slidable in the direction of the Y axis is mounted on each slider 11.

The above described guide member 13 is screwed together with a ball screw axis 16 in the direction of the X axis which is provided in the up-down direction within the case 11b via a nut member 15 which is secured to the guide member 13, and this ball screw axis 16 in the direction of the X axis is rotated clockwise and counterclockwise by an X axis swing motor (AC servo motor) 17 which is attached to the case 11b in such a manner that the swing head 14 swings in the up-down direction (direction of the X axis) around the support axis 12.

Figure 3:
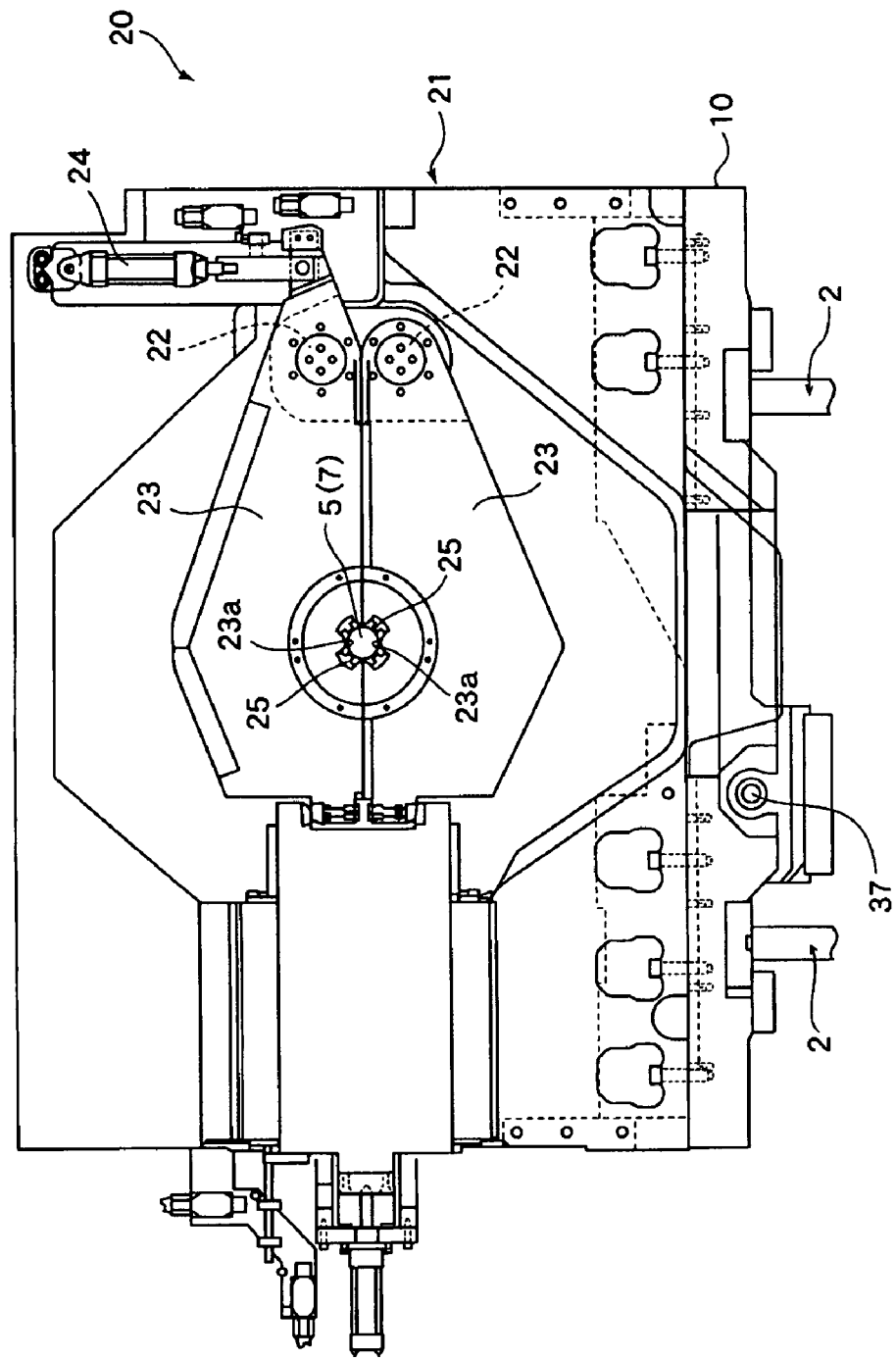
FIG. 3 is a front diagram showing a work rest.

A work rest 20 is secured to the saddle 10 in the second cutter unit 4b from among the above described two cutter units 4a and 4b in such a state as to keep the position relative to the cutter unit 4b constant, and thus, the cutter unit 4b and the work rest 20 move together as the saddle 10 moves. The work rest 20 is provided with a rest base 21 which is secured to the saddle 10 as shown in FIG. 3, and a pair of axes 22 and 22 are provided on one end side of this rest base 21 in such a manner that a pair of rest arms 23 and 23 can open and close by rotating around these axes 22 and 22. These rest arms 23 and 23 open and close when an oil hydraulic cylinder 24 which is attached between the base end portion of the rest arm 23 on one side (upper side in FIG. 3) and the rest base 21 operates so as to extend and contract. Notches 23a and 23a in semicircular form are created approximately in the center portion on the surface of the respective rest arms 23 and 23 which face each other in such a manner that rest pads 25 which are provided in these notches 23a when the rest arms 23 and 23 close support the main journals 7 of the work piece 5. The work rest 20 works to clamp and support the main journal 7 which is adjacent to the portion being machined when a pin journal 9 in the work piece 5 is machined using the below described cutter 55, so that the work piece 5 does not vibrate.

As shown in FIG. 4(a), a Y axis feed mechanism 30 for moving the above described slider 11 in the direction of the Y axis is provided with a ball screw axis 32 in the direction of the Y axis, which is provided on each saddle 10 so as to extend in the direction of the Y axis and screwed together with a nut member 31 which is secured to the slider 11, and a Y axis feed motor (AC servo motor) 33 for driving and rotating this ball screw axis 32 in the direction of the Y axis, and thus, is formed in such a manner that the slider 11 can be moved in the direction of the Y axis by rotating the ball screw axis 32 in the direction of the Y axis clockwise and counterclockwise using the Y axis feed motor 33.

As shown in FIG. 4(b), a Z axis feed mechanism 35 for moving the above described saddle 10 in the direction of the Z axis is provided with a ball screw axis 37 in the direction of the Z axis, which is provided on the bed 2 so as to extend in the direction of the Z axis and screwed together with a nut member 36 which is secured to the saddle 10, and a Z axis feed motor (AC servo motor) 38 for driving and rotating this ball screw axis 37 in the direction of the Z axis, and thus, is formed in such a manner that the saddle 10 can be moved in the direction of the Z axis by rotating the ball screw axis 37 in the direction of the Z axis clockwise and counterclockwise using the Z axis feed motor 38.

Figure 5:
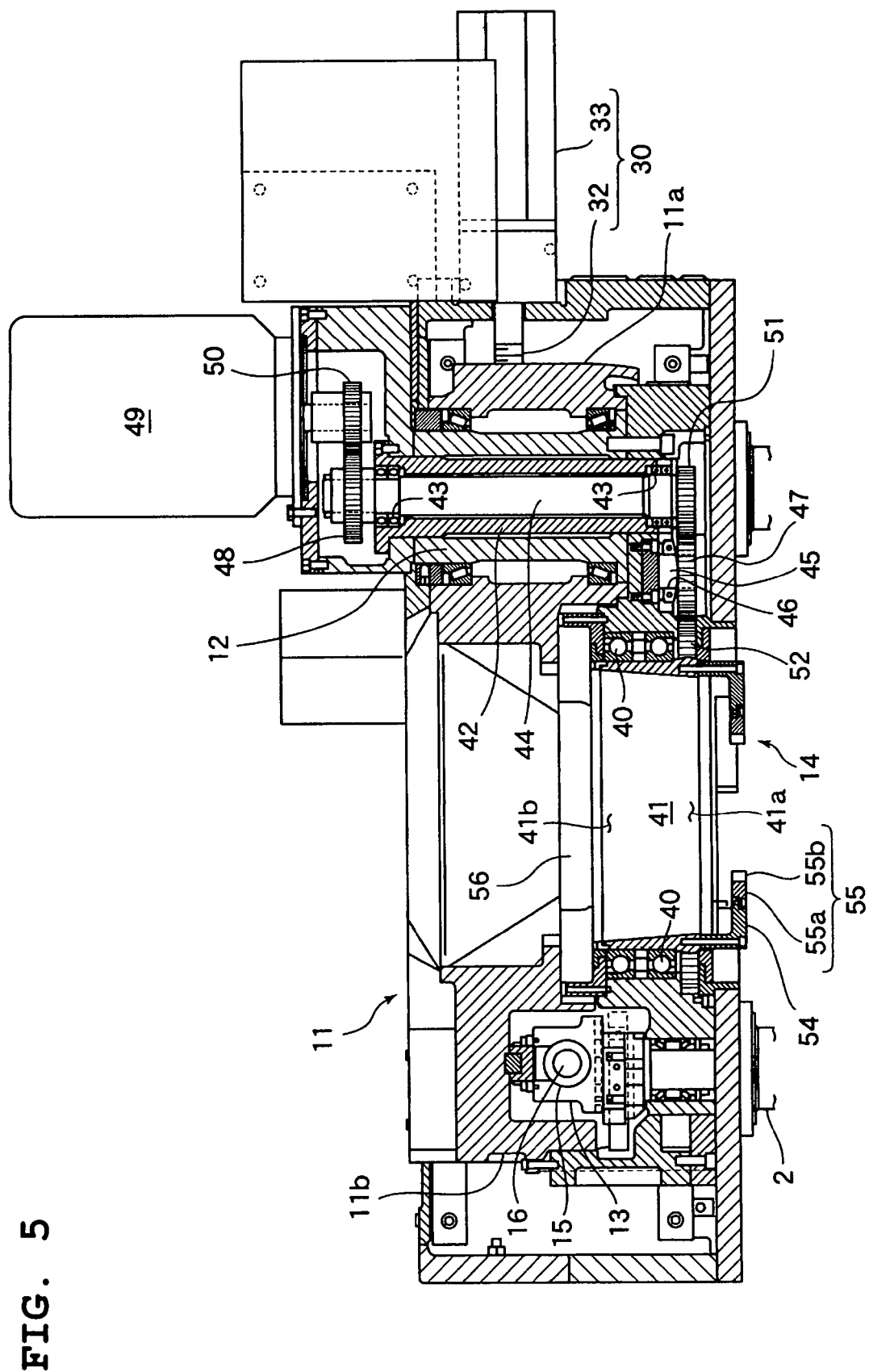
FIG. 5 is a cross sectional diagram showing the cutter unit along Q-Q in FIG. 4(a)

As shown in FIG. 5, a cutter drum 41 is supported within the above described swing head 14 via bearings 40 in such a manner as to be freely rotatable. Meanwhile, a rotational axis 44 is supported within the above described support axis 12 via a sleeve 42 and bearing 43 in such a manner as to be freely rotatable. An idle axis 45 is provided between the above described cutter drum 41 and the rotational axis 44, and an idle gear 47 is supported by this idle axis 45 via a bearing 46 in such a manner as to be freely rotatable. A first gear 48 is secured in one end portion of the above described rotational axis 44, and this first gear 48 is engaged with a drive gear 50 which is secured to the output axis of a cutter motor (AC spindle motor or induction motor) 49. In addition, a second gear 51 which is engaged with the above described idle gear 47 is secured in the other end portion of the above described rotational axis 44, and a driven gear 52 which is engaged with the above described idle gear 47 is secured in the outer peripheral portion of the above described cutter drum 41. In addition, the rotational force the output axis of the cutter motor 49 is conveyed to the cutter drum 41 through the drive gear 50, the first gear 48, the rotational axis 44, the second gear 51, the idle gear 47 and the driven gear 52 so that the cutter rum 41 is driven and rotated by the cutter motor 49.

A cutter 55 (corresponding to the "rotary cutter" of the present invention) is mounted in the opening 41a via a cutter adaptor 54 on the machining stage side (lower side in FIG. 5) of the above described cutter drum 41. As shown in FIG. 6(a), this cutter 55 is formed of a main cutter body 55a in ring form and a number of cutter chips 55b which are attached in the inner peripheral portion of this main cutter body 55a at certain intervals in the direction of the circumference, and these cutter chips 55b can create a trench 56 (see FIG. 6(b)) in the two end portions of the pin journals 9 in the work piece 5 and pin journal thrust surfaces 58 which continue to the respective trenches 56 and make a right angle with the outer peripheral surface 57 of the pin journal at the same time.

Here, in the present embodiment, the above described cutter 55 is mounted only on the cutter drum 41 of the swing head 14 in the first cutter unit 4a between the two above described cutter units 4a and 4b via the cutter adaptor 54, and no cutter 55 as that described above is mounted on the cutter drum 41 of the swing head 14 in the second cutter unit 4b (see FIG. 2).

Next, the control system of the crankshaft milling machine according to the present embodiment is described in the following, in reference to the block diagram of FIG. 7.

Figure 7:
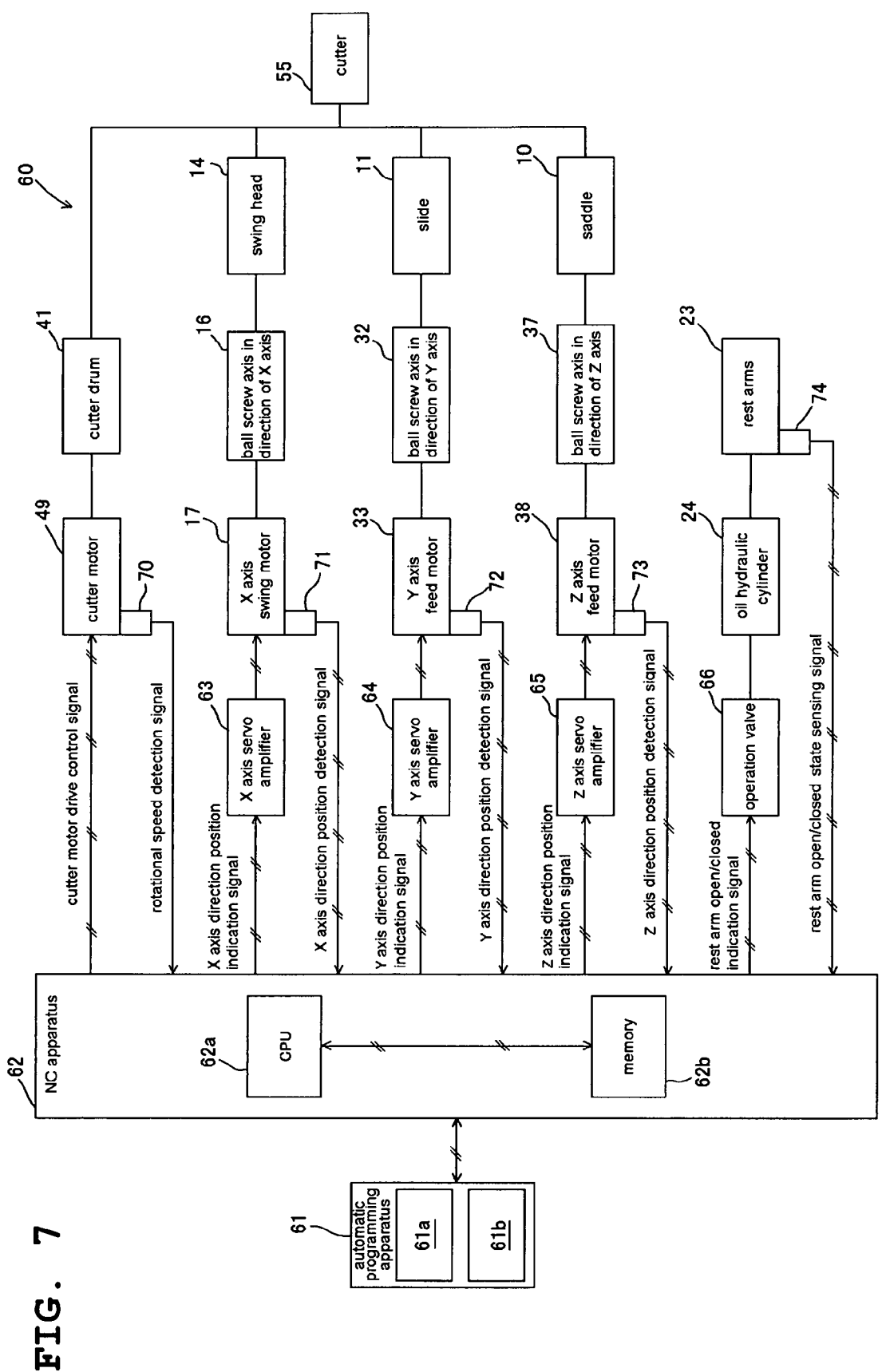
FIG. 7 is a block diagram showing a control system of a crankshaft milling machine.

The control system 60 shown in FIG. 7 is constructed so as to have an automatic programming apparatus 61, an NC apparatus 62 (corresponding to the "control apparatus" of the present invention) in which a central processing unit (CPU) 62a and a memory (ROM, RAM or the like) 62b are built in, and which has a sequence control function and a numeral control function, an X axis servo amplifier 63 for driving the X axis swinging motor 17, a Y axis servo amplifier 64 for driving a Y axis feed motor 33, a Z axis servo amplifier 65 for driving a Z axis feed motor 38, and an operation valve 66 for the expansion and contraction operation of the oil hydraulic cylinder 24 for the opening and closing operation of the rest arm 23.

Here, a rotational speed detector (for example a tachometer generator) 70 for detecting the rotational speed of the above described cutter motor 49 is attached to the cutter motor 49, position detectors (for example rotary encoders) 71, 72 and 73 for detecting the position in the direction of the X axis, in the direction of the Y axis and in the direction of the Z axis are attached to the above described X axis swinging motor 17, the Y axis feed motor 33 and the Z axis feed motor 38, respectively, and a rest arm open/closed state sensor (for example a limit switch) 74 for sensing the open/closed state of the above described rest arm 23 is attached to this rest arm 23. A rotational speed detection signal, which is detected by the above described rotational speed detector 70, a position in the direction of each axis detection signal, which is detected by the above described position detectors 71, 72 and 73, and a rest arm open/closed state sensing signal which is sensed by the above described rest arm open/closed state sensor 74 are all supplied to the NC apparatus 62 as feedback signals. Here, in the case where an induction motor is adopted as a cutter motor 49, the above described rotational speed detector 70 is unnecessary.

Figure 8:
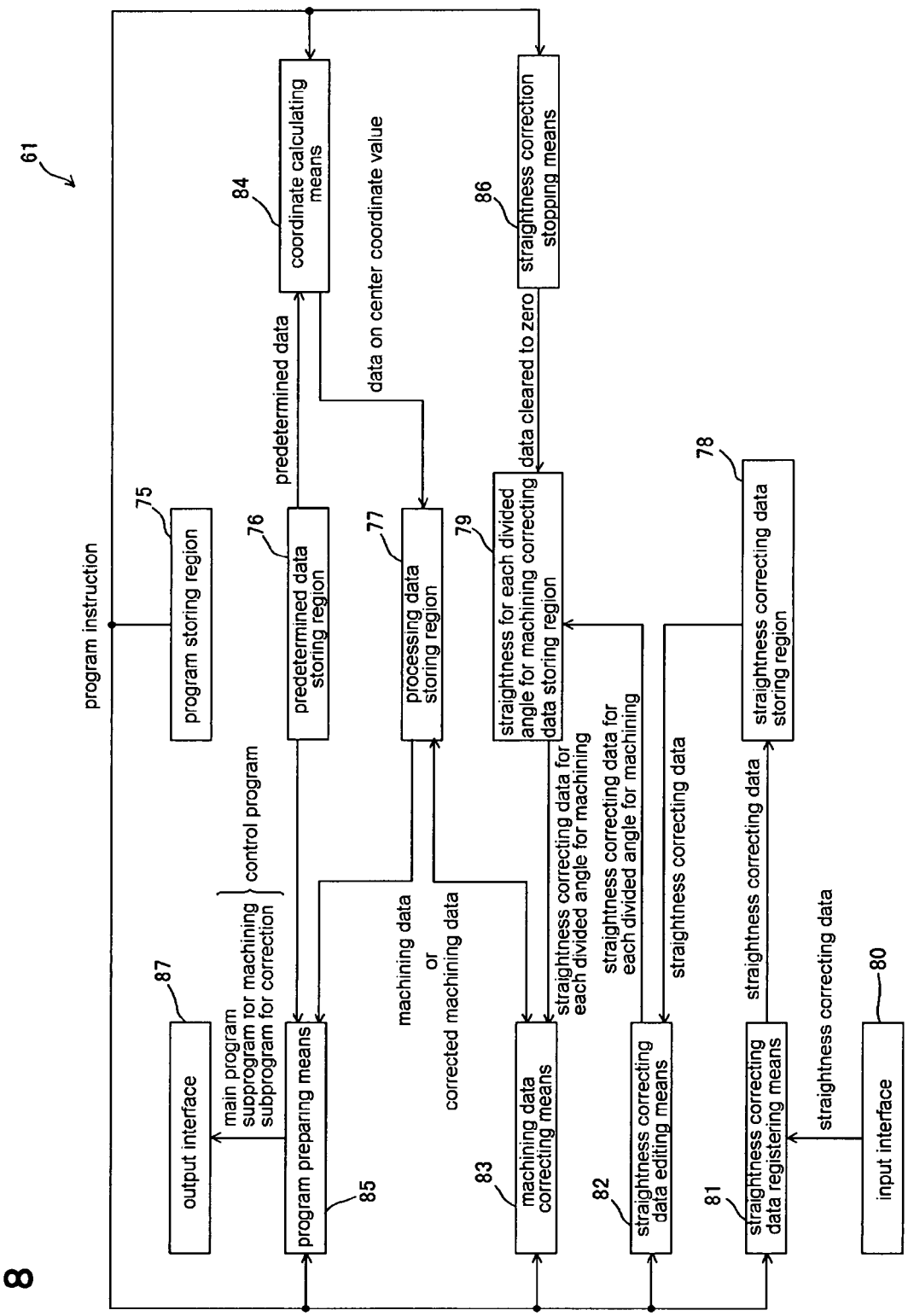
FIG. 8 is a function block diagram of an automatic programming apparatus.

The above described automatic programming apparatus 61 is made by building in an automatic programming software (corresponding to the "program" in the present invention) in a computer apparatus, and is formed so that it can automatically prepare a control program (main program, subprogram for machining, subprogram for correction and the like) for controlling the crankshaft milling machine 1. As shown in FIG. 8, this automatic programming apparatus 61 is provided with a program storing region 75 in which automatic programming software is stored, a predetermined data storing region 76 for storing predetermined data, a machining data storing region 77 for storing machining data, a straightness correcting data storing region 78 for storing data for correcting the straightness, and a straightness for each divided angle for machining correcting data storing region 79 for storing data for correcting the straightness for each divided angle for machining. Here, as the predetermined data stored in the above described predetermined data storing region 76, (1) the dimensions of the machined workpiece in the longitudinal direction when the workpiece 5 is machined and the dimensions of the machined thrust surface 58 of the pin journal, and (2) the pin radius, a ½ stroke, a phase and other measurements of the pin journal 9 to be machined can be cited. In addition, the machining data stored in the above described machining data storing region 77 is the results of operation for the center coordinate values of the cutter 55 at the time of machining, that is to say, the results of operation of the coordinates along the X, Y and Z axes.

In addition, this automatic programming apparatus 61 is provided with a straightness correcting data registering means 81 for registering the straightness correcting data inputted via an input interface 80 in the straightness correcting data storing region 78, a straightness correcting data editing means 82 for converting the straightness correcting data stored in the straightness correcting data storing region 78 to straightness correcting data for each divided angle for machining of the cutter 55 by proportionally dividing the straightness correcting data, a machining data correcting means 83 for correcting the machining data on the basis of the straightness correcting data for each divided angle for machining gained by the straightness correcting data editing means 82, a coordinate operating means 84 for operating the center coordinate values (coordinate values along the X, Y and Z axes) of the cutter 55 at the time of machining on the basis of the predetermined data stored in the predetermined data storing region 76, a program preparing means 85 for preparing a main program, a subprogram for machining, a subprogram for correction and the like on the basis of the predetermined data stored in the predetermined data storing region 76 and preset machining data or the corrected machining data after correction by the machining data correcting means 83, and a straightness correction releasing means 86 for clearing the data stored in the straightness for each divided angle for machining correcting data storing region 79 to zero, and these means 81 to 86 fulfill their functions when automatic programming software stored in the program storing region 75 is run. Main programs, subprograms for machining and subprograms for correction which are prepared in this automatic programming apparatus 61 are transferred to the NC apparatus 62 via an output interface 87.

Thus, in the control system 60 shown in FIG. 7, a main program, a subprogram for machining and a subprogram for correction which are transferred to the NC apparatus 62 from the automatic programming apparatus 61 are once stored in the memory 62b of the NC apparatus 62, and the main program, the subprogram for machining and the subprogram for correction which are stored in this memory 62b are run in the CPU 62a of the NC apparatus 62, and thus, a cutter motor drive control signal, an X axis direction position indication signal, a Y axis direction position indication signal, a Z axis direction position indication signal and a rest arm open/closed indication signal are outputted from this NC apparatus 62. The above described cutter motor drive control signal is conveyed to a cutter motor 49 and feedback control is carried out on the basis of a feedback signal from the rotational speed detector 70 which is attached to this cutter motor 49, and thus, the rotational speed of the cutter motor 49 is controlled, and the rotational operation of the cutter 55 is controlled via the cutter drum 41. In addition, the above described X axis direction position indication signal, Y axis direction position indication signal and Z axis direction position indication signal are conveyed to the X axis swing motor 17, the Y axis feed motor 33 and the Z axis feed motor 38 via the X axis servo amplifier 63, the Y axis servo amplifier 64 and the Z axis servo amplifier 65, respectively, so that feedback control is carried out on the basis of the feedback signals from the respective position detectors 71, 72 and 73 which are attached to the respective axis motors 17, 33 and 38, and thus, the amount of feed of the respective axis motors 17, 33 and 38 is controlled so that the cutter 55 is positioned in the direction of the X axis, in the direction of the Y axis and in the direction of the Z axis. Furthermore, the above described rest arm open/closed indication signal is conveyed to the operation valve 66, and as a result, the operation valve 66 operates and through this valve operation, the oil hydraulic cylinder 24 is operated so as to extend or contract, and thus, the opening/closing operation of the rest arm 23 is carried out in the work rest 20.

Figure 9:
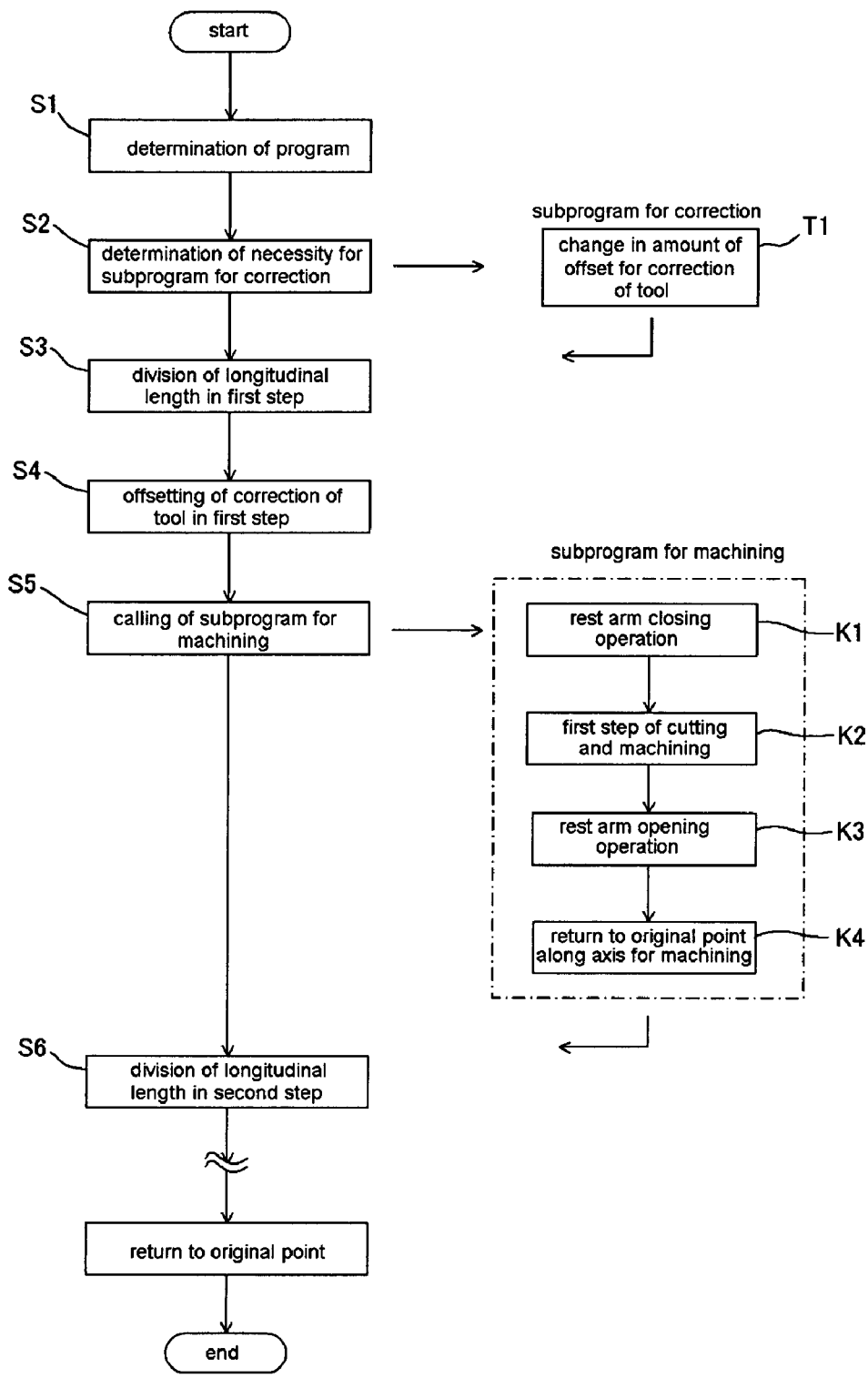
FIG. 9 is a flow chart illustrating the process carried out by the main program.

Next, the operation for machining the work piece 5 using the cutter 55 is described in reference to the flow chart of FIG. 9. This machining operation is carried out when a main program, a subprogram for machining and a subprogram for correction prepared in the automatic programming apparatus 61 are transferred to the NC apparatus 62 and the main program is run in the NC apparatus 62. Here, in the flow chart shown in FIG. 9, symbols "S," "T" and "K" are separate steps.

In the flow chart shown in FIG. 9, a process for determining the program (S1) and a process for determining the necessity for the subprogram for correction (S2) are respectively carried out, and at the same time, a process for changing the offset amount for correcting a tool (T1) is carried out by running the subprogram for correction if necessary, and furthermore, a process for dividing the longitudinal length in the first step (S3) and a process for offsetting correction of the tool in the first step (S4) are carried out, and thus, the cutter 55 attached to the first cutter unit 4a is positioned at the first pin journal 9A, and the work rest 20 which is attached to the second cutter unit 4b is positioned at the second main journal 7B. After the completion of positioning, the subprogram for machining is called (S5).

[Subprogram for Machining: Rest Arm Closing Operation (K1)]

When the subprogram for machining which is called in the above described step S5 is run, an instruction signal for closing the rest arm is outputted to the operation valve 66 from the NC apparatus 62, and as a result, the oil hydraulic cylinder 24 contracts and the rest arm 23 of the work rest 20 operates and closes. In this manner, the work rest 20 supports the second main journal 7B.

[Subprogram for Machining: Step of First Cutting Process (K2)]

Next, the process shown in FIGS. 10(*a*) to 10(*f*) is carried out on the workpiece 5 using the cutter 55, which rotates at the preset rotational speed for machining and moves following an instruction to move along the X, Y and Z axes (see FIGS. 12 and 13).

Here, in the process shown in FIGS. 10(*a*) to 10(*f*), FIG. 10(*a*) shows the starting state, where the center of the cutter and the center of the crankshaft (workpiece 5) are the same and cutting starts from this position. When the cutter 55 moves from the state shown in FIG. 10(*a*) to the state shown in FIG. 10(*b*), that is to say, the cutter 55 moves upward in a straight line, plunge cutting, which is cutting of the workpiece 5 in a straight line, is carried out. After that, the cutter 55 rotates around the workpiece 5, and thus, rotary cutting, which is cutting of the workpiece 5 in arc form, is started. When this rotary cutting is carried out from 0° to 360°, as shown in FIGS. 10(*c*) to 10(*f*), trenches 56 in the two end portions of the first pin journal 9A in the workpiece 5 (see FIG. 6(*b*)) and thrust surfaces 58 of the pin journal, which continue to the trenches 56 and make a right angle with the outer peripheral surface 57 of the pin journal, are created at the same time.

[Subprogram for Machining: Operation for Opening Rest Arm (K3)]

Next, a signal for instructing opening of the rest arm is outputted to the operation valve 66 from the NC apparatus 62, and thus, the oil hydraulic cylinder 24 extends so that the rest arm 23 of the work rest 20 operates and opens. In this manner, the work rest 20 stops supporting the second main journal 7B.

[Subprogram for Machining: Return of Machining Axis to Original Point (K4)]

Next, an X axis direction position indication signal and a Y axis direction position indication signal for returning the cutter 55 to the original point in the X-Y coordinates are respectively outputted, and thus, the cutter 55 is returned to the original point in the X-Y coordinates.

Then, from step S6 onward, the step of the second cutting process, the step of the third cutting process and the step of the fourth cutting process are respectively carried out by the sub-program for machining, in the same manner as in the above described steps K1 to K4, and thus, trenches 56 are created in the two end portions of the respective second pin journal 9B, the third pin journal 9C and the fourth pin journal 9D in the workpiece 5, and a thrust surface 58 of each pin journal, which continues to the respective trenches 56 and makes a right angle with the outer peripheral surface 57 of the pin journal, is created. When all of the steps for machining a pin journal are completed in this manner, the saddle 10, the slider 11 and the swing head 14 return to the original point, and after that, the main program is completed, so that the cutting process on one workpiece 5 is completed.

Figure 11:
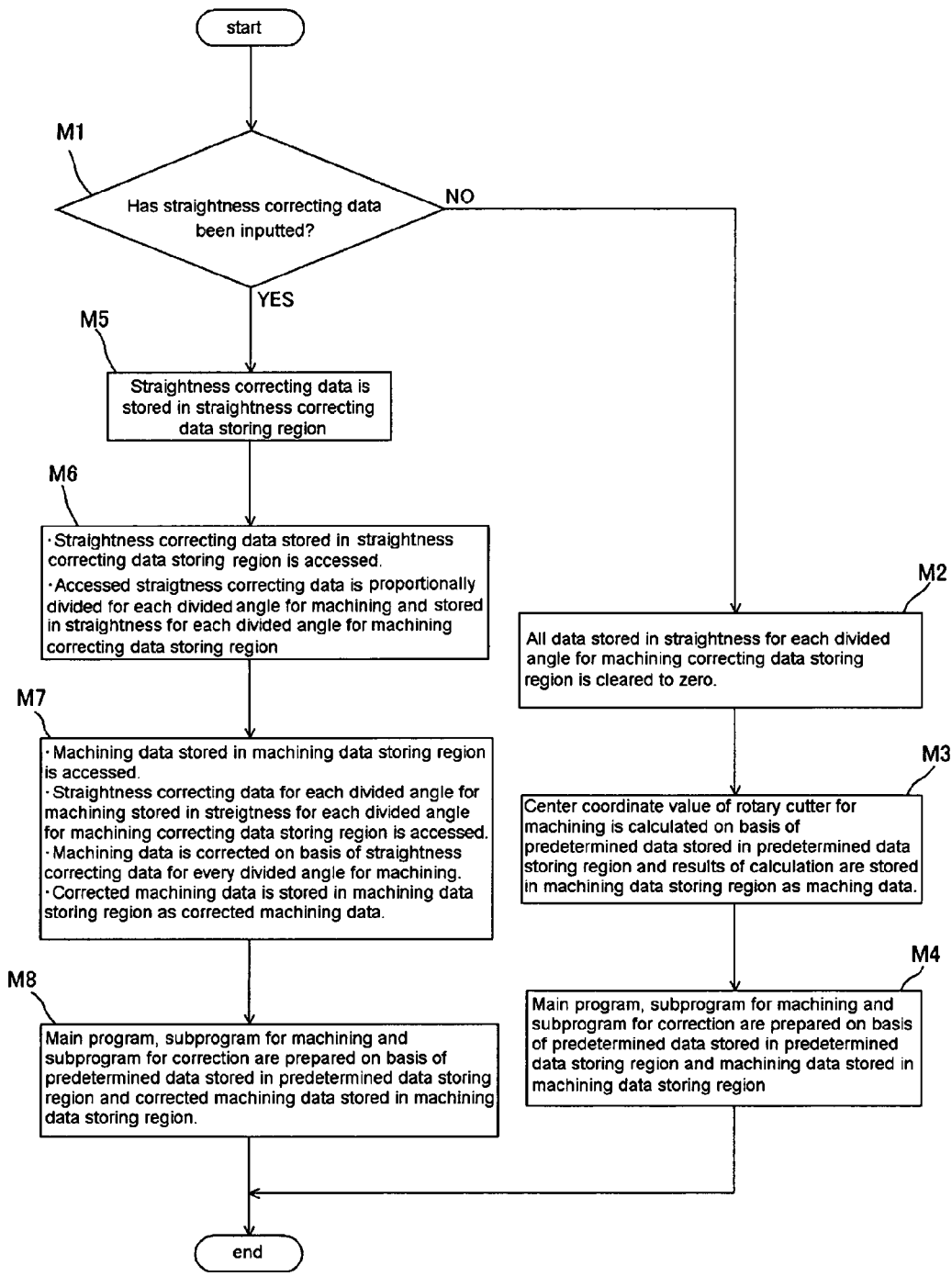
FIG. 11 is s flow chart illustrating the machining operation in the automatic programming apparatus.

Next, the machining operation of the automatic programming apparatus 61 is described in the following, in reference to the functional block diagram of FIG. 8 and the flow chart of FIG. 11. Here, in the flow chart shown in FIG. 11, symbol "M" is a step.

First, whether or not data for correcting the straightness has been inputted via the input interface 80 is determined (M1). In the case where the data for correcting the straightness has not been inputted, the means for releasing correction of the straightness 86 clears all of the data stored in the straightness for each divided angle for machining correcting data storing region 79 to zero (M2). Next, the coordinate operation means 84 calculates the center coordinate values (coordinate values along the X, Y and Z axes) of the cutter 55 for machining on the basis of predetermined data stored in the predetermined data storing region 76, and these calculation results are stored in the machining data storing region 77 as machining data (M3). Next, the program preparing means 85 prepares a main program, a subprogram for machining and a subprogram for correction on the basis of the predetermined data stored in the predetermined data storing region 76 and the machining data stored in the machining data storing region 77 (M4). In the subprogram for machining prepared in this step M4, no operation for correcting feed of the cutter 55 in the direction of the Z axis is carried out, and therefore, as shown in FIG. 12, an X axis coordinate indicating value and a Y axis coordinate indicating value are written only into the region for writing in the instruction to move along the X axis 91 and the region for writing in the instruction to move along the Y axis 92, respectively, in the region for writing in the instruction to carry out machining using the cutter 55 for machining 90.

Meanwhile, in the case where it is determined that data for correcting the straightness has been inputted in the above described step M1, the straightness correcting data registering means 81 registers the straightness correcting data inputted via the input interface 80 in the straightness correcting data storing region 78 (M5). Next, the straightness correcting data editing means 82 accesses the straightness correcting data stored in the straightness correcting data storing region 78 and converts this accessed straightness correcting data to straightness correcting data for each divided angle for machining of the cutter 55 through proportional division, and this straightness correcting data for the divided angle for machining is stored in the straightness for each divided angle for machining correcting data storing region 79 (M6). Next, the machining data correcting means 83 accesses the machining data stored in the machining data storing region 77 and the straightness correcting data for each divided angle for machining stored in the straightness for each divided angle for machining correcting data storing region 79, and then corrects this accessed machining data on the basis of this straightness correcting data for each divided angle for machining, and stores this corrected machining data in the machining data storing region 77 as corrected machining data (M7). Next, the program preparing means 85 prepares a main program, a subprogram for machining and a subprogram for correction on the basis of the predetermined data stored in the predetermined data storing region 76 and the corrected machining data stored in the machining data storing region 77 (M8). In the subprogram for machining prepared in this step M8, an operation for correcting feed of the cutter 5 in the direction of the Z axis is carried out, and therefore, as shown in FIG. 13, a region for writing in an instruction to move along the Z axis is added in the region for writing in an instruction to carry out machining using the cutter 55 for machining 90, and thus, an X axis coordinate indicating value, a Y axis coordinate indicating value and a Z axis coordinate indicating value are written into the region for writing in an instruction to move along the X axis 91, the region for writing in an instruction to move along the Y axis 92 and the region for writing in an instruction to move along the Z axis 93, respectively.

Next, the preparation of the above described straightness correcting data and the input thereof are described.

The above described straightness correcting data is gained by measuring the dimensions of the thrust surface 58 of the pin journal to be machined in the workpiece 5 on which the first machining has been completed through all of the steps for machining the pin journals by running the above described main program and comparing the results of measurement with the target dimensions for the pin journals to be machined.

That is to say, the thrust surface 58 of the pin journal in the machined workpiece 5 is first measured using a straightness measuring machine, not shown. Meanwhile, the straightness correcting mode is selected by operating the operation portion 61b (see FIG. 7) of the automatic programming apparatus 61. When the straightness correcting mode is selected, a screen as that shown in FIG. 14 is displayed in the display portion 61a of the automatic programming apparatus 61. On the display screen shown in FIG. 14, the display screen in the portion indicated by symbol 95 is a screen schematically showing the thrust surface 58 of the pin journal, and the display screen in the portion indicated by symbol 96 is a table for inputting straightness correcting data. Here, in the schematic diagram of the display screen 95, the longitudinal axis P indicates the thrust surface 58 of the pin journal which has the target dimensions for the pin journal to be machined, that is to say, the ideal thrust surface 58 of the pin journal which makes a precise right angle with the outer peripheral surface 57 of the pin journal in a linearly unrolled view in a range from 0° to 360° in the direction of the circumference with the points at which the cutter 55 cuts in as the original point (0°). Meanwhile, in the table of the display screen 96, in the column "angle," numeral values indicate the angle every 10°, so that the values 0°, 10°, 20° . . . 340°, 350° and 360°, the straightness correcting data inputted for every angle indicated in the column "angle" is indicated in the column "corrected value," the straightness correcting data that is inputted at the time is indicated in the column "value at time," and the sum of the straightness correcting data in the column "corrected value" and the straightness correcting data in the column "value at time" is indicated in the column "total value."

Figure 15:
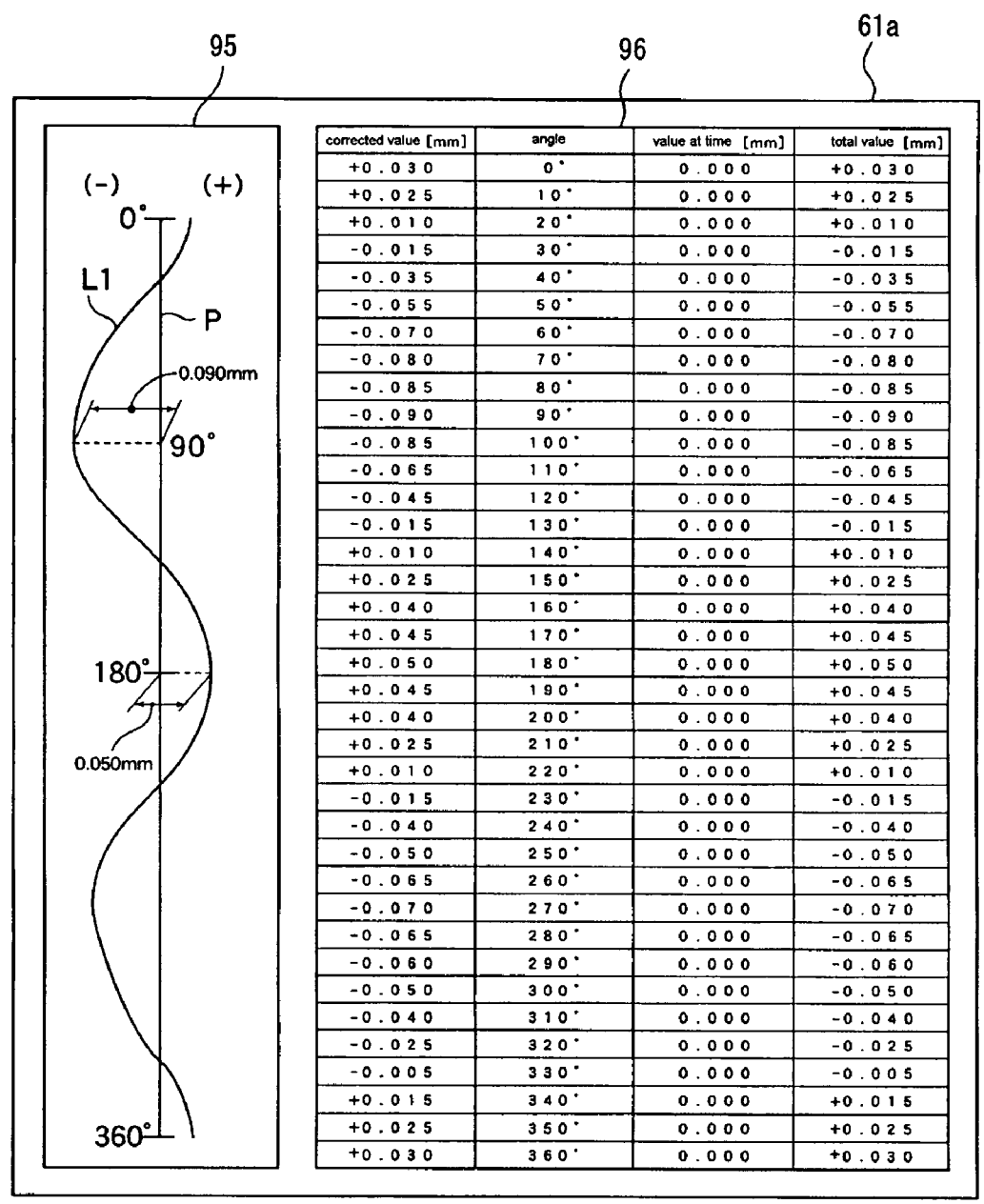
FIG. 15 is a diagram showing the state of the display screen in a displaying portion after data for correcting the straightness is inputted.

Next, the measured data of the thrust surface 58 of the pin journal in the machined workpiece 5 that was measured using a straightness measuring machine is inputted into an automatic programming apparatus 61. Then, line L1 shown in FIG. 15 is added on the display screen 95. This line L1 is shown by making the data of the thrust surface 58 of the pin journal measured using the straightness measuring machine correspond to the longitudinal axis P.

Next, the distance between the ideal thrust surface of the journal (longitudinal axis P) and the measured data (line L1) is measured for every 10° starting from the original point (0°). At this time, (+) indicates that the line L1 is on the right side of the longitudinal axis P, and (−) indicates that the line L1 is on the left side of the longitudinal axis P. Here, in the case where the distance of line L1 from the longitudinal axis P on the left side is 0.090 mm at 90° along the longitudinal axis P, for example, on the display screen 95 shown in FIG. 15, −0.090 mm is gained as straightness correcting data. In addition, in the case where the distance of line L1 from the longitudinal axis P on the right side is 0.050 mm at 180° along the longitudinal axis P, +0.050 mm is gained as straightness correcting data. In the same manner as described above, the straightness correcting data for every 10° is found for all of the pin journals 9A to 9D, and the thus gained straightness correcting data is inputted in sequence so as to correspond to the numeral value of the angle indicated in the column "angle" by operating the operation portion 61b. Taking the state of the display portion 61a of the first pin journal 9A when the straightness correcting data is inputted as an example, the straightness correcting data for every 10° is added and displayed in the column "corrected value" in the table of the display screen 96, as shown in FIG. 15. In the first correcting operation, no straightness correcting data has yet been inputted, and therefore, the numeral values for every 10° in the column "value at time" are zero, and straightness correcting data of the same value as the straight correcting data in the column "corrected value" is displayed in the column "total value." This is the same for other pin journals 9B to 9D, detailed description using drawings is omitted.

The straightness correcting data for every 10° that has been inputted into the automatic programming apparatus 61 through the above described operation is registered in the straightness correcting data storing region 78 by the straightness correcting data registering means 81 for all of the pin journals 9A to 9D (M5), and the straightness correcting data registered in this straightness correcting data storing region 78 is converted to the straightness correcting data for each divided angle for machining by the straightness correcting editing means 82, and after that, stored in the straightness for each divided angle for machining correcting data storing region 79 (M6). Furthermore, the machining data stored in the machining data storing region 77 is corrected by the machining data correcting means 83 on the basis of the straightness correcting data for every divided angle for machining which is stored in the straightness for each divided angle for machining correcting data storing region 79, that is to say, the straightness correcting data for every divided angle for machining is added to or subtracted from the previously set machining data and the results of this calculation are stored in the machining data storing region 77 as corrected machining data (M7). In addition, a subprogram for machining is prepared by the program preparing means 85 on the basis of the predetermined data stored in the predetermined data storing region 76 and the corrected machining data stored in the machining data storing region 77 (M8). The thus prepared corrected subprogram for machining (see FIG. 13) is transferred to the NC control apparatus 62.

Figure 16:
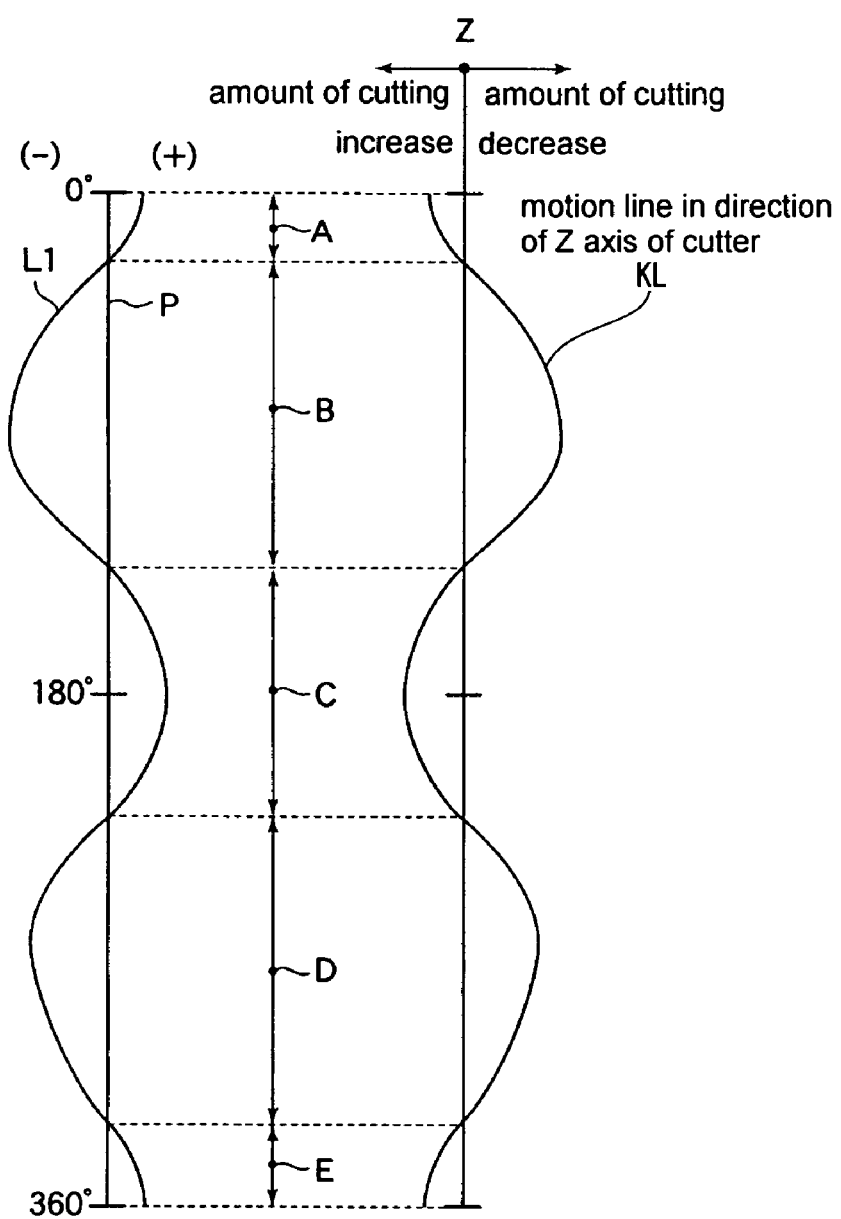
FIG. 16 is a diagram showing the movement of the cutter in the direction of the Z axis on the basis of the data for correcting the straightness.
Figure 17:
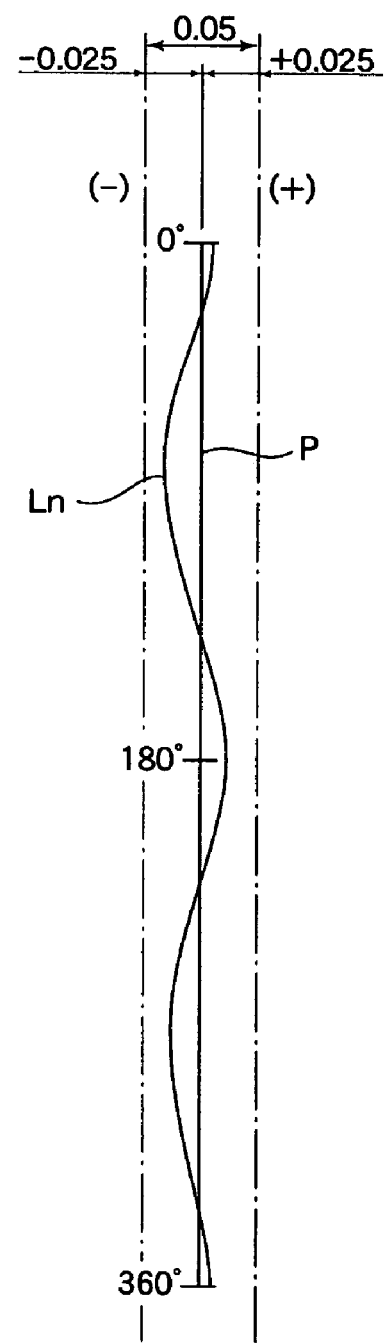
FIG. 17 is a diagram showing only the main portion of the display screen in a displaying portion when the results of measurement show that the straightness relative to the thrust surface of an ideal pin journal is within an allowable range.

Then, a new workpiece 5 which is to be machined next is set between the two work heads 3, and the main program shown in FIG. 9 is again run in the NC apparatus 62, and at the same time, the corrected subprogram for machining (see FIG. 13) is run, so that the cutter 55 is controlled by the amount of feed in the direction of the Z axis, as shown by the line denoted by KL in FIG. 16 following an instruction to move along the Z axis which is written in this corrected subprogram for machining (contents in the region for writing in an instruction 93). That is to say, the amount of feed of the cutter 55 in the direction of the Z axis (direction of the axis of the workpiece) is controlled by the Z axis feed mechanism 35 in such a manner that the amount of cutting is reduced in portions in which the amount of cutting was great at the time of the first machining at the time of the next machining (see regions B and D in FIG. 16), and the amount of feed of the cutter 55 in the direction of the Z axis is controlled by the Z axis feed mechanism 35 in such a manner that the amount of cutting is increased in portions in which the amount of cutting was small at the time of the first machining at the time of the next machining (see regions A, C and E in FIG. 16). As a result, as shown in FIG. 17, a thrust surface of the pin journal (line Ln) that is within an allowable range in terms of precision (for example +/−0.025 mm) relative to the ideal thrust surface of the pin journal (longitudinal axis P) can be gained, and the precision in the straightness on the thrust surface 58 of the pin journal can be increased easily and in a short period of time in comparison with when a correction means for taking apart and adjusting the machine is used.

Here, in the case where the straightness on the thrust surface 58 of the pin journal is poor in certain portions, the straightness correcting data of the thrust surface 58 of this pin journal is prepared, and it is possible to store only this data in the straightness correcting data storing region 78 in order to increase the precision in the straightness on the thrust surface 58 of the pin journal.

In addition, in the case where the workpiece 5 is of a different type, measurement of the machined workpiece 5 using a straightness measuring machine and the step of preparing straightness correcting data through comparison between the results of measurement and the target dimensions for the workpiece to be machined are carried out again and the thus gained straightness correcting data is inputted into the automatic programming apparatus 61, and this sequence of operations can be carried out whenever a different type of workpiece 5 is introduced, and thus, the precision in the straightness on the thrust surface 58 of the pin journal can be increased for different types of workpieces.

Though in the present embodiments, a technique for improving the precision in the straightness on the thrust surface 58 of the pin journal which makes a right angle with the outer peripheral surface 57 of the pin journal is described, the precision in the straightness on the thrust surface of the main journal which makes a right angle with the outer peripheral surface of the main journals 7 can, of course, be increased in the same manner using the above described technique.

In addition, in the above described automatic programming apparatus 61, a circularity correcting data storing region (same as straightness correcting data storing region 78) for storing the circularity correcting data which is gained through comparison between the results of measurement of the dimensions of the outer peripheral surface of the pin journal 9 (or the outer peripheral surface of the main journal 7) to be machined and the target dimensions for the journal to be machined, and a circularity for each divided angle for machining correcting data storing region (same as straightness for each divided angle for machining correcting data storing region 79) for storing circularity correcting data for each divided angle for machining are provided, and together with these, a circularity correcting data registering means (same as straightness correcting data registering means 81) for registering the above described circularity correcting data which is inputted via the input interface 80 in the above described circularity correcting data storing region, a circularity correcting data editing means (same as straightness correcting data editing means 82) for converting the circularity correcting data stored in the above described circularity correcting data storing region to circularity correcting data for each divided angle for machining using the cutter 55 through proportional division, and a machining data correcting means (same as machining data correcting means 83) for correcting machining data on the basis of the circularity correcting data for each divided angle for machining which is gained by this circularity correcting data editing means are provided, and thus, the precision in the circularity on the outer peripheral surface of the pin journal 9 (or the outer peripheral surface of the main journal 7) can be increased.

In addition, though in the present embodiments, an example where the present invention is applied to a crankshaft milling machine 1 for cutting and machining a crankshaft (workpiece 5) using an inner blade type cutter 55 is shown, the present invention can be applied to a crankshaft milling machine for cutting and machining a crankshaft using an external blade type cutter made of a main cutter body in disc form and a number of cutter chips attached in the outer peripheral portion of this main cutter body at certain intervals in the direction of the circumference without deviating from the gist of the present invention.

The invention claimed is:

1. A method for machining a crankshaft wherein a first cutting process is carried out on a first crankshaft using a rotary cutter based on preset machining data, thereby forming a thrust surface of a journal of the first crankshaft which makes a right angle with an outer peripheral surface of the journal of the first crankshaft, the method comprising preparing data for correcting a straightness of the thrust surface of the journal by comparing (i) results of a measurement of dimensions of the thrust surface of the journal having been machined in the first crankshaft on which said first cutting process has been carried out, and (ii) target dimensions for the thrust surface of the journal; and correcting said preset machining data based on said data for correcting the straightness of the thrust surface of the journal, thereby obtaining corrected machining data, wherein an amount of feed of said rotary cutter is controlled in a direction along a longitudinal axis of the crankshaft based on the corrected machining data when performing a second cutting process on a second crankshaft subsequent to the machining of the first crankshaft.

* * * * *

UNITED STATES PATENT AND TRADEMARK OFFICE
CERTIFICATE OF CORRECTION

PATENT NO. : 8,215,883 B2
APPLICATION NO. : 11/891563
DATED : July 10, 2012
INVENTOR(S) : Takeshi Suzuki Page 1 of 1

It is certified that error appears in the above-identified patent and that said Letters Patent is hereby corrected as shown below:

On the title page:

Item (73) Assignee;

change "Komatsu Machinery Corporation Ltd., Komatsu-shi (JP)"
to --Komatsu NTC. Ltd., Toyama (JP)--.

Signed and Sealed this
Eleventh Day of June, 2013

Teresa Stanek Rea
*Acting Director of the United States Patent and Trademark Office*